United States Patent [19]

Shields

[11] 3,877,569

[45] Apr. 15, 1975

[54] APPARATUS TO TRANSFER AND INVERT A SYRINGE BARREL FROM ONE CONVEYOR TO ANOTHER CONVEYOR

[76] Inventor: Walter A. Shields, Jamaica, N.Y.

[22] Filed: Dec. 1, 1972

[21] Appl. No.: 311,334

[52] U.S. Cl. .................. 198/243; 198/25; 198/210; 198/241; 214/1 BD

[51] Int. Cl. .......................................... B65g 47/24

[58] Field of Search ....... 214/1 BD; 198/25, 33 AD, 198/210, 241, 243, 20 R

[56] References Cited

UNITED STATES PATENTS

| | | | |
|---|---|---|---|
| 2,004,492 | 6/1935 | McNamara et al. | 198/33 AD |
| 2,224,975 | 12/1940 | McNamara | 214/1 BC |
| 2,959,301 | 10/1965 | Willsea | 214/1 BC |
| 3,100,051 | 8/1963 | Schreiber | 198/33 AD |
| 3,300,020 | 1/1967 | Seaman et al. | 198/210 |
| 3,710,937 | 1/1973 | Cook | 198/24 |
| 3,726,384 | 4/1973 | Archibald | 198/25 |

*Primary Examiner*—Richard A. Schacher
*Assistant Examiner*—Richard K. Thomson

[57] ABSTRACT

An oscillating turret is provided with gripping members rotated by the rotation of the turret so that syringe barrels are transferred from a first conveyor extending substantially in the horizontal plane of the turret to a second conveyor extending in a horizontal plane above the horizontal plane of the turret and members oscillated relative to the two conveyors to transfer the syringe barrel from the first conveyor to a gripping member and transfer said syringe barrel from said gripping member to the second conveyor. The position of the syringe barrel is reversed during the oscillation of the turret.

10 Claims, 3 Drawing Figures

APPARATUS TO TRANSFER AND INVERT A SYRINGE BARREL FROM ONE CONVEYOR TO ANOTHER CONVEYOR

It is an object of the invention to provide apparatus for performing the step shown at station I in my patent application Ser. No. 264,960 filed June 21, 1972, now U.S. Pat. No. 3,807,119 issued Apr. 30, 1974.

The invention relates to apparatus for transferring and inverting syringe barrels from a first conveyor to a second conveyor extending in different horizontal planes and comprises a turret rotatably carrying gripping members on diametrically opposite portions and said gripping members being rotated 180 degrees by a 180 degree rotation of the turret whereby said syringe barrel will be delivered to the second conveyor in an inverted or reversed position. When the gripping members are positioned in alignment with the conveyors, members pivotally mounted adjacent to the discharge end of the first conveyor and the receiving end of the second conveyor are oscillated to transfer a syringe barrel from the first conveyor to a gripping member and transfer an inverted syringe barrel from the opposed gripping member to the second conveyor.

Figure 2:
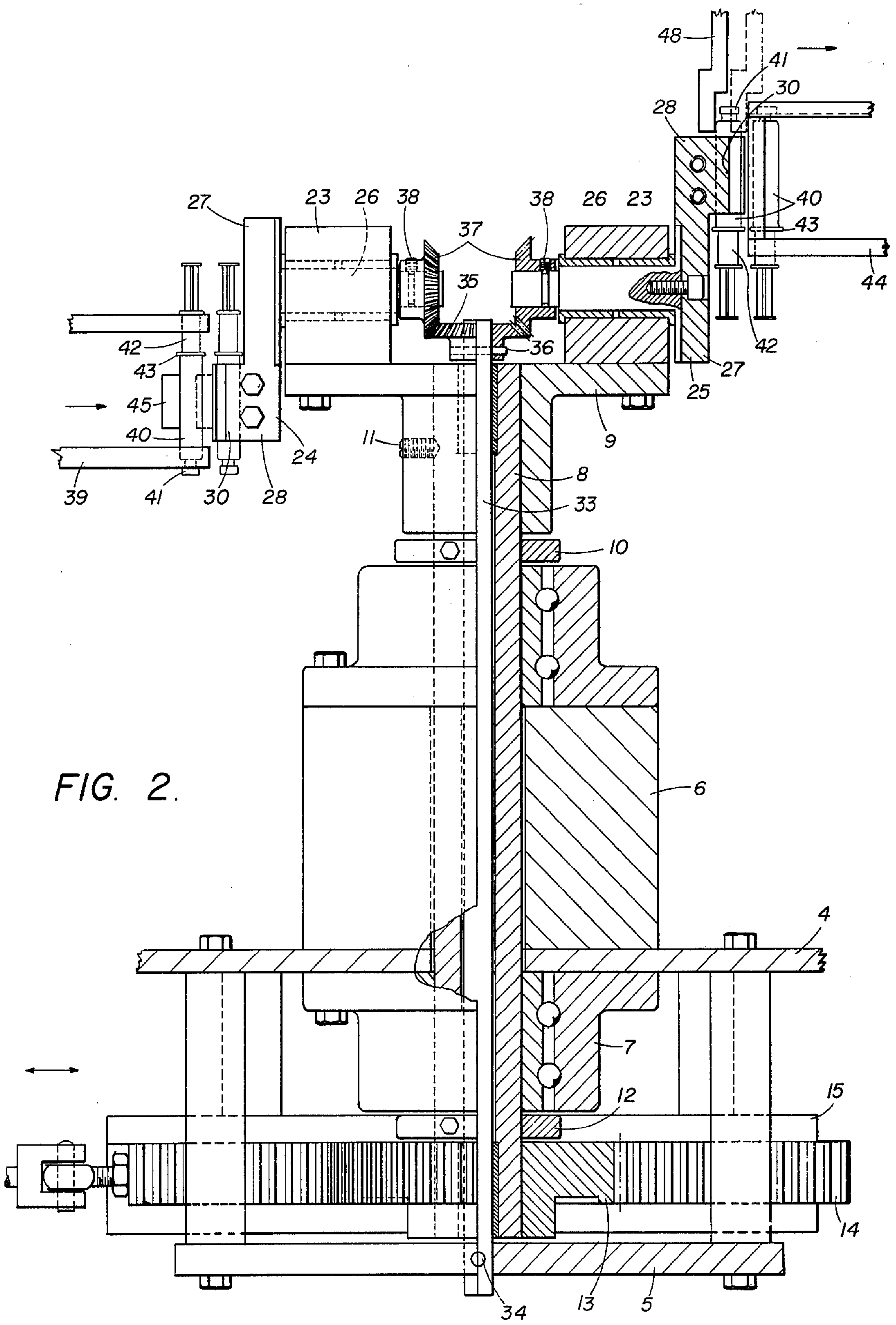
FIG. 2 is an elevational view of the apparatus partly in section.
Figure 3:
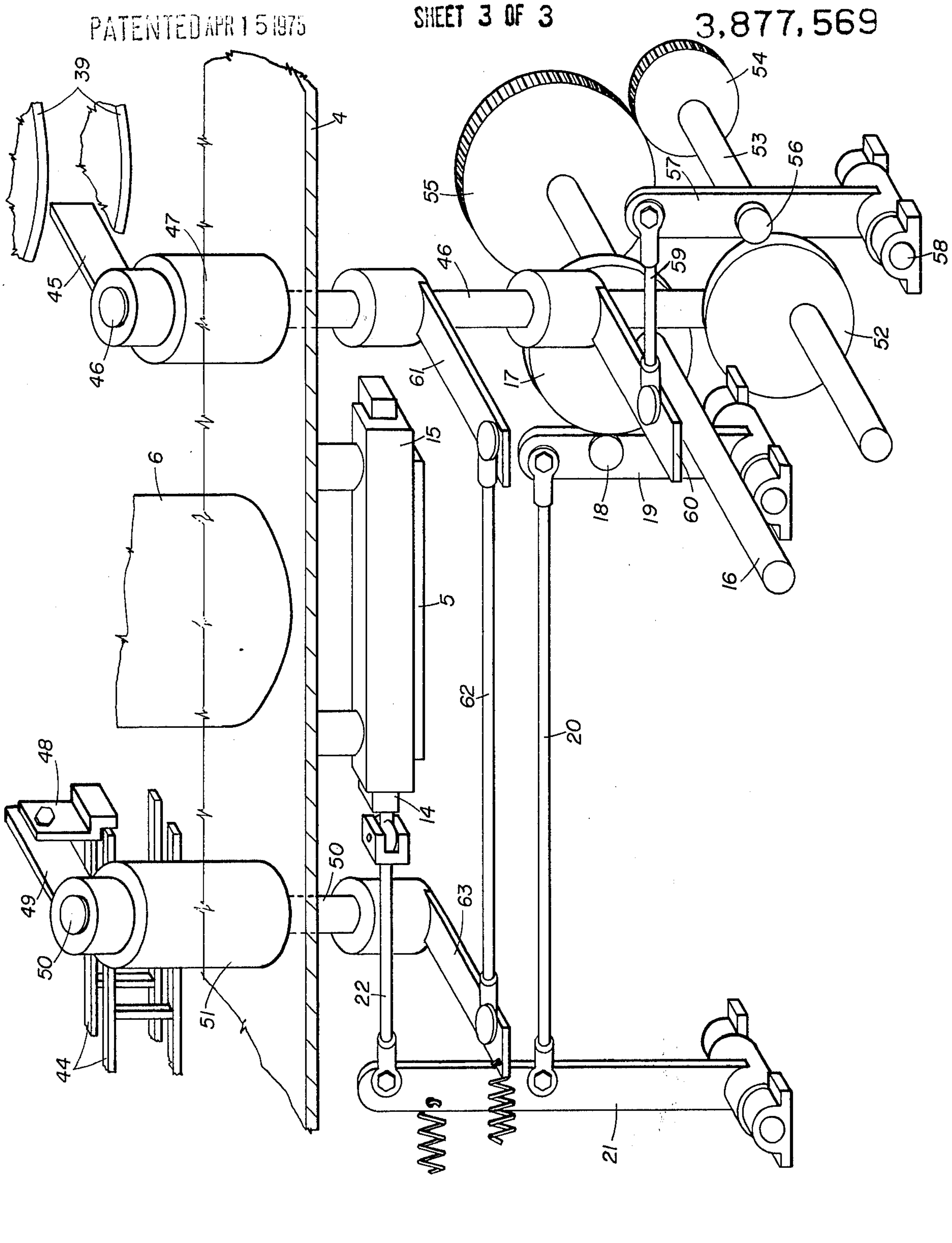
FIG. 3 is a perspective view of actuating mechanism of the apparatus.

The embodiment of the invention is mounted on a table 4 having a platform 5 suspended therefrom, as shown in FIG. 2. A hollow column 6 is clamped to the table 4 by a base 7 below the table. The column 6 and base 7 rotatably support a tubular shaft 8 having the opposite end portions extended above the column 6 and below the base 7. The upper end portion of the shaft 8 fixedly supports a turret 9 by a collar 10 and a set-screw 11 which permits rotary adjustment of the turret 9 and the shaft 8. The lower portion of the shaft 8 is provided with a collar 12 to prevent longitudinal movement of the shaft 8 in an upward direction. The lower end portion of the shaft 8 is also arranged with a pinion 13 meshing with a toothed rack 14 slidable in a slide-bar 15 supported between the table 4 and the platform 5. The rack 14 is reciprocated by a continuously rotating shaft 16 having fixed thereto a cam disc 17 engaging a cam follower 18 on a pivoted arm 19 pivotally connected to a link 20 pivotally connected to a pivoted arm 21 pivotally connected to a link 22 pivotally connected to the rack 14, as shown in FIG. 3, whereby the turret 9 is rotated 180 degrees both clockwise and counter-clockwise. The shaft 16 may be connected to a source of power.

Figure 1:
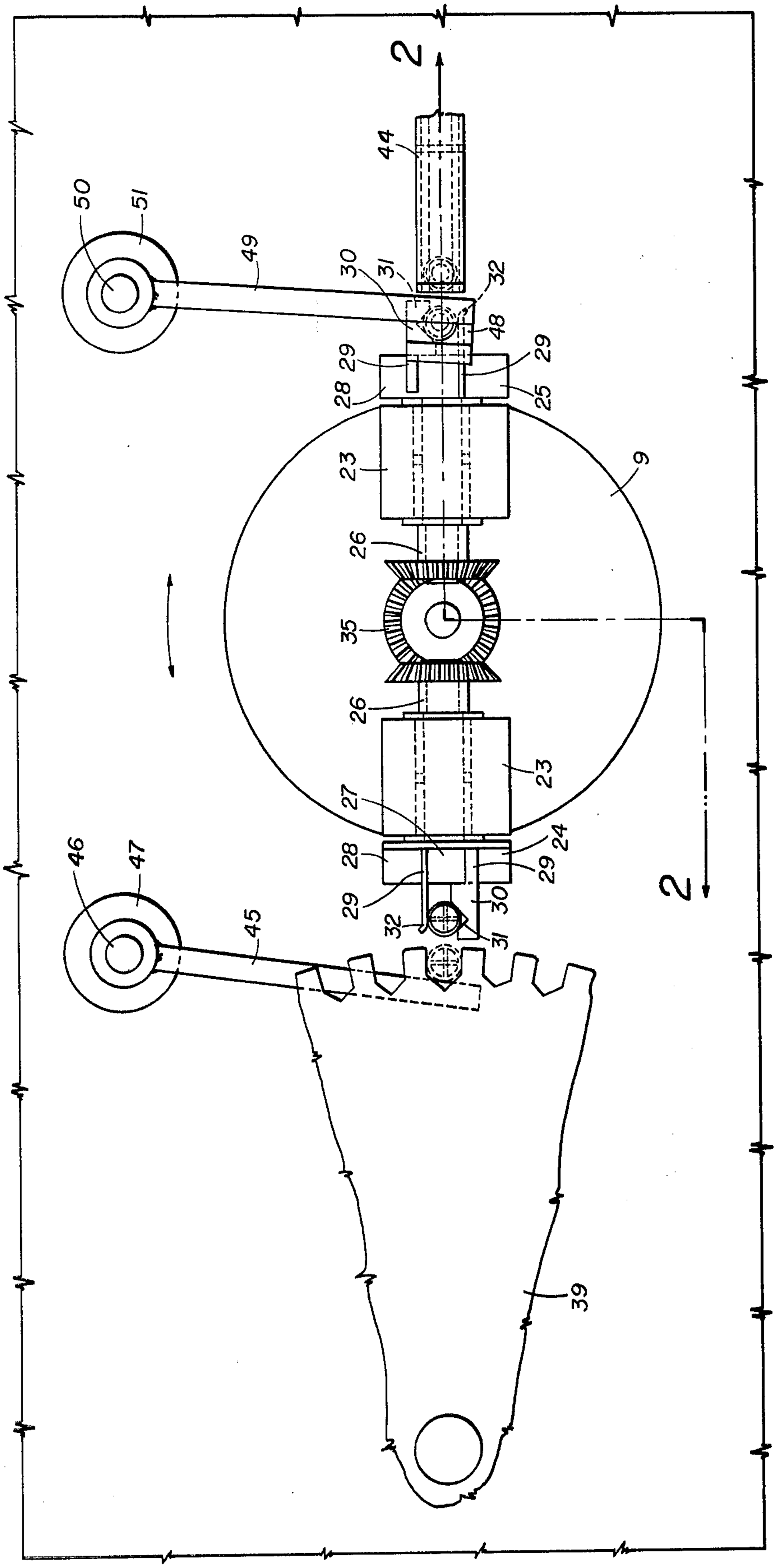
FIG. 1 is a top plan view of the apparatus embodying the turret, gripping members and transferring members.

The turret 9 is provided with two blocks 23 secured to diametrically opposite portions of the turret 9 and rotatably support gripping members 24 and 25. Both gripping members 24 and 25 are of the same structure but are mounted on shafts 26 to extend in opposite directions from said shafts 26. The shafts 26 are rotatably mounted in the blocks 23. Each of the gripping members 24 and 25 comprises an arm 27 secured to the outer end of each shaft 26 to extend beyond the periphery of the turret 9 and an end portion of each arm 27 is extended beyond the blocks 23 and provided with a wide portion 28 arranged with spaced slots 29 for the mounting of a lateral jaw 30 provided with a notch 31 and a resilient finger 32, both jaw 30 and finger 32 projecting outwardly from the wide portion 28, as shown in FIGS. 1 and 2. The wide portion 28 of the gripping member 24 extends from the shaft 26 in a direction 180 degrees different from the direction in which the wide portion 28 of the gripping member 25 extends from the shaft 26, as shown in FIG. 2.

The oscillation of the turret 9 is arranged to rotate the gripping members 24 and 25 180 degrees during each 180 degrees of rotation of the turret 9. This is accomplished by providing a shaft 33 supported in the tubular shaft 8 and secured against rotation by a pin 34 in the lower end portion of the shaft 33 and the platform 5, as shown in FIG. 2. The upper end portion of the shaft 33 is extended above the turret 9 and supports a bevel gear 35 secured to the shaft 33 by a pin 36. Each of the shafts 26 is provided with bevel gear 37 secured to said shaft 26 by a pin 38 and meshing with bevel gear 35.

Multiple compartment syringes are intermittently presented to either gripping member 24 or 25 when the wide portion 28 is lowermost by an intermittently rotated twin deck turret 39. The multiple compartment syringes comprises an empty powder carrying syringe barrel 40 having the mouth 41 lowermost when supported by the turret 39. A fully assembled liquid carrying syringe barrel 42 is inserted into the flanged end 43 of the syringe barrel 40, as shown in FIG. 2. The object of the present invention is to remove the multiple compartment syringes 40–43 from the turret 39 during its periods of rest and transfer said syringes 40–43 to a conveyor 44 with the mouth 41 uppermost. To accomplish this object, the turret 39 extends in a horizontal plane with the decks thereof spaced equidistances above and below the turret 9 and the conveyor 44 extends in a horizontal plane above the horizontal plane of the turret 9, as shown in FIG. 2. The conveyor 44 is a single row vibratory conveyor.

The multiple compartment syringe positioned by the turret 39 in vertical alignment with the gripping member 24 or 25 having the wide portion 28 lowermost is transferred to the space between the jaw 30 and the finger 32 of said gripping member 24 or 25 by pivotally mounted means comprising an arm 45 secured to the upper end of a shaft 46 in a bearing 47.

The inverted multiple compartment syringe is removed from the gripping member 24 or 25 having the wide portion 28 uppermost to the conveyor 44 by pivotally mounted means comprising an arm 49 secured on the upper end of a shaft 50 rotatably supported in a bearing 51. The arm 49 is provided with a finger 48 to engage the syringe barrel 40, as shown in FIG. 2.

The arms 45 and 49 are simultaneously reciprocated in the same direction by a cam disc 52 fixed on a shaft 53 having a gear 54 meshing with a gear 55 secured on the shaft 16, as shown in FIG. 3. The cam disc 52 is engaged by a cam follower 56 on an arm 57 pivotally mounted at 58 and pivotally connected by a link 59 to an arm 60 secured on the shaft 46. The shaft 46 is provided with an arm 61 pivotally connected to one end of a link 62 having the other end pivotally connected to an arm 63 secured on the shaft 50.

Having thus described my invention, I claim:

1. In apparatus to transfer and invert a syringe barrel from a first conveyor to a second conveyor spaced from the first conveyor, a turret oscillating between the conveyors, gripping members rotatably supported by the turret and arranged to removably hold a syringe barrel, means to oscillate said turret and transfer the gripping members from a syringe barrel receiving position to a syringe barrel discharge position, means to rotate the gripping members by the oscillation of the turret, means pivotally mounted and positioned relative to each conveyor, and means to oscillate the first of said pivotal means to transfer a syringe barrel from the first conveyor to a gripping member and to oscillate the second of said pivoted means to transfer a syringe barrel from a gripping member to the second conveyor.

2. Apparatus as claimed in claim 1, wherein the turret is oscillated 180 degrees in opposite directions.

3. Apparatus as claimed in claim 1, wherein the means to rotate the gripping members is arranged to oscillate said gripping members 180 degrees.

4. Apparatus as claimed in claim 1, wherein each gripping member comprises an arm rotatably supported adjacent one end and the opposite end provided with a fixed lateral jaw and a resilient finger extending parallel to and spaced from the lateral jaw a distance less than the exterior diameter of the syringe barrels.

5. Apparatus as claimed in claim 1, wherein the means to oscillate the turret comprises a pinion connected to the turret and a rack meshing with the pinion, and means to reciprocate the rack.

6. Apparatus as claimed in claim 1, wherein the means to rotate the gripping members comprises a first pinion fixedly mounted in the center of the turret and a second pinion connected to each gripping member and meshing with the first pinion whereby rotation of the turret will cause rotation of the gripping members.

7. Apparatus as claimed in claim 1, wherein the pivotally mounted means comprises a post rotatably mounted adjacent to the discharge end of the first conveyor and a second post rotatably mounted adjacent to the receiving end of the second conveyor, and an arm secured to each post.

8. Apparatus as claimed in claim 7, wherein the means to oscillate the pivotal members comprises an arm pivotally mounted and connected to the first post, a cam disc reciprocating said arm, and means connecting the two posts whereby oscillation of the first post will simultaneously oscillate the second post.

9. Apparatus as claimed in claim 4, wherein the first conveyor extends substantially in the horizontal plane of the turret, and the second conveyor extends in a horizontal plane above the horizontal plane of the turret, and the means to rotate the gripping members is arranged to position the jaws and resilient fingers in horizontal alignment with the discharge end of the first conveyor and in horizontal alignment with the receiving end of the second conveyor.

10. Apparatus as claimed in claim 5, wherein the means to reciprocate the rack comprises a first arm pivotally mounted and operatively connected to the rack, a second arm pivotally mounted and connected to the first arm, and a continuously rotating cam reciprocating the second arm.

* * * * *